United States Patent
White

[11] Patent Number: 6,131,239
[45] Date of Patent: Oct. 17, 2000

[54] GROUND DEBRIS VACUUM

[76] Inventor: Carl Lee White, 101 W. Cypress, Compton, Calif. 90220

[21] Appl. No.: 09/281,949

[22] Filed: Mar. 31, 1999

[51] Int. Cl.⁷ ...................................................... A47L 5/28
[52] U.S. Cl. .............................. 15/352; 15/327.5; 15/339; 15/353
[58] Field of Search ............................. 15/350, 352, 353, 15/327.5, 339, 330

[56] References Cited

U.S. PATENT DOCUMENTS

| | | | |
|---|---|---|---|
| 1,461,173 | 7/1923 | Bennett | 15/353 |
| 3,267,511 | 8/1966 | Meyerhoefer | 15/353 |
| 3,862,466 | 1/1975 | Jabsen | 15/353 X |
| 4,041,569 | 8/1977 | Petersen | 15/353 |
| 4,549,329 | 10/1985 | St. Clair | 15/353 |
| 4,566,149 | 1/1986 | Fitzwater | 15/353 X |
| 5,084,937 | 2/1992 | Hague | 15/353 X |
| 5,586,359 | 12/1996 | Iida | 15/330 X |
| 5,722,110 | 3/1998 | McIntyre et al. | 15/327.5 X |
| 5,813,088 | 9/1998 | Wagner et al. | 15/327.5 |
| 5,950,274 | 9/1999 | Kilstrom | 15/350 |

*Primary Examiner*—Chris K. Moore
*Attorney, Agent, or Firm*—Erik M. Arnhem

[57] ABSTRACT

Leaves and other loose debris on a ground surface can be removed and collected by a portable vacuum that includes a motor-operated fan located at the upper end of an upright passage structure that has a lower intake end proximate to the ground surface. The vacuum is supported by two ground wheels at the lower intake end of the passage structure, and a shoulder strap attached to an upper section of the passage structure. The vacuum includes a rotary debris cutter in a mid area of the passage structure, and a centrifugal particle separation located between the cutter and the motor-operated fan.

4 Claims, 1 Drawing Sheet

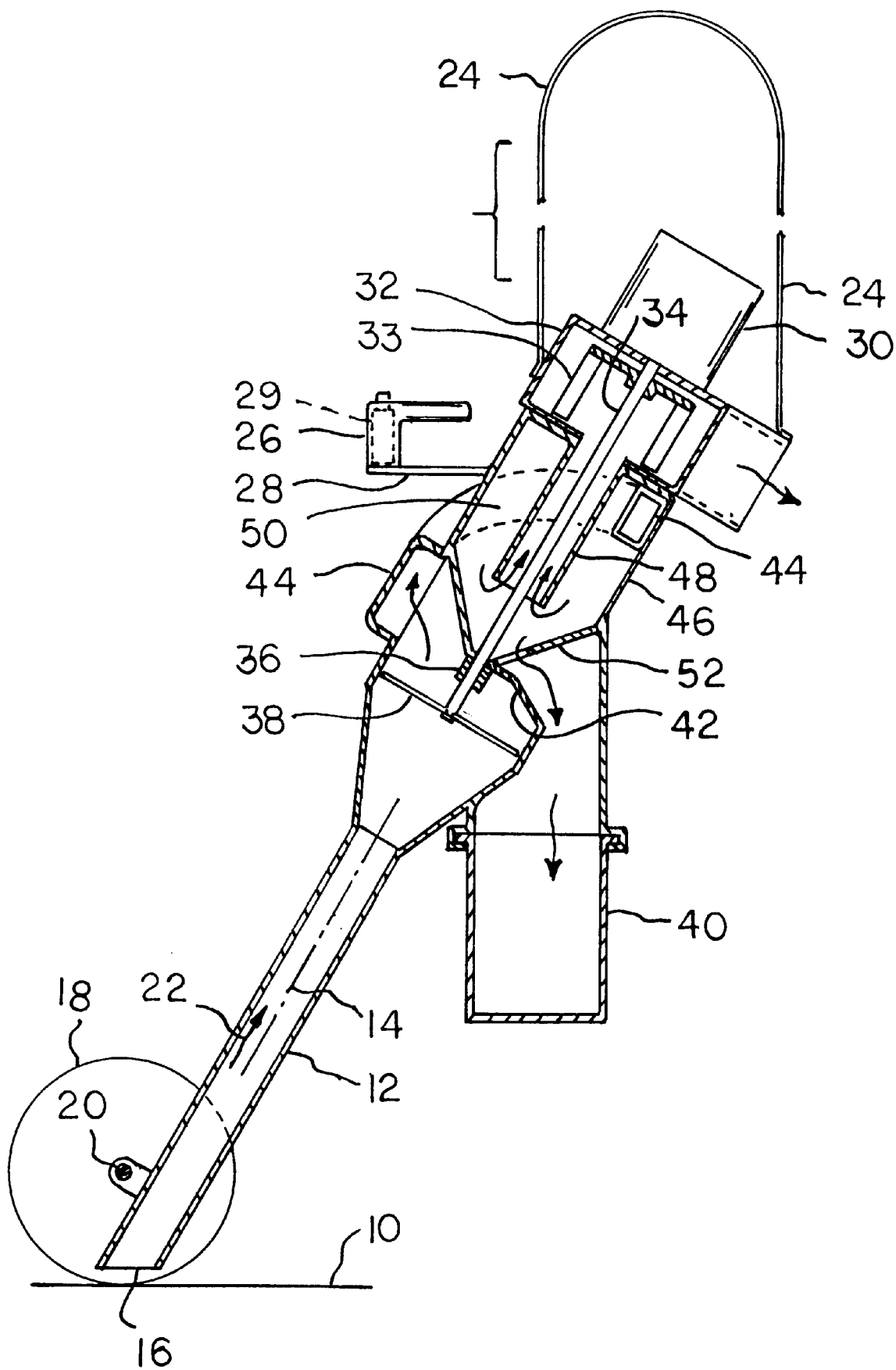

GROUND DEBRIS VACUUM

BACKGROUND AND SUMMARY OF THE INVENTION

This invention relates to a portable outdoor vacuum for removing leaves, grass and other debris from the ground surface. In preferred practice of the invention, the vacuum comprises a motor-powered fan means located at the upper end of an upright passage structure that includes a debris separation device communicating with a debris-collection container. The vacuum is supported by means of two ground wheels located at the lower end of the passage structure and a shoulder strap attached to the passage structure near the fan means.

Under conventional practice, leaves and other debris are dispersed from the ground surface by means of a hand-held implement that directs a pressurized stream of air angularly against the ground surface. Leaves and other debris are propelled along the ground surface by the force of the pressurized air. By manipulating the implement it is possible to concentrate the debris into a pile that can be picked up for collection in a suitable container.

The present invention relates to a portable vacuum device that can be used to pick up the ground debris and separate the debris from the vacuum air stream for collection in a container carried by the vacuum device. The portable vacuum device collects the debris in an on-board container, thereby eliminating the task of transferring the debris from a pile into a container.

Further features of the invention will be apparent from the attached drawings and description of an illustrative embodiment of the invention.

BRIEF DESCRIPTION OF THE DRAWINGS

The single FIGURE of the drawing is a sectional view taken through a portable vacuum constructed according to the invention.

DESCRIPTION OF A PREFERRED EMBODIMENT OF THE INVENTION

The drawings show a portable vacuum embodying the invention, and adapted for removing leaves and other debris from a ground surface 10. The portable vacuum comprises an upright passage structure 12 having an axis 14 located at an acute angle to ground surface 10, such that a person holding the vacuum can walk along the ground, with the lower air intake end 16 of the passage structure, slightly in advance of the person's body.

Two aligned ground wheels 18 are mounted on a fixed axle 20 near the lower end of the passage structure, for positioning the air intake end of the passage structure a slight distance above the ground surface, whereby a vacuum force existing in the passage structure can draw debris into the intake end 16 for transport through the passage structure as indicated by numeral 22 in the drawing.

Passage structure 12 is partially supported by a shoulder strap 24 having opposite ends thereof fastened to upper end surfaces of the passage structure. A hand grip 26 is mounted on a bracket 28 at a front section of the passage structure, such that the person can walk along the ground surface with strap 24 overlying his shoulder, and with one hand on hand grip 26. The vacuum is supported partially by shoulder strap 24 and partially by ground wheels 18.

Hand grip 26 houses an electric switch 29 that has a push button actuator on the handle upper surface, whereby the person can operate the switch while his hand encircles the hand grip. Switch 29 is wired to an electric motor 30 that powers a centrifugal fan 32 located on the upper end of passage structure 12, so that switch 29 operation turns the fan on and off.

Fan 32 comprises a squirrel cage rotor 33 mounted on the motor shaft 34 for rotation around a shaft axis that is co-axial with passage axis 14. Shaft 34 extends downwardly along axis 14 through a bearing 36, to mount a rotary cutter blade 38. The blade has sharpened edges that slice through airborne leaves and other debris passing upwardly through passage structure 12, such that the debris is fragmented into relatively small particulates having the capability for close packing when deposited into a collection container 40 carried by the vacuum.

As the debris passes upwardly across the plane of cutter blade 38 the particulate material is deflected by a partition 42 into a spiral passage 44 that extends partially around cylindrical wall 46 of the passage structure. Cylindrical wall 46 is co-axial with a small diameter tube 48 that encircles shaft 34, so as to form an annular centrifugal debris separation chamber 50.

Spiral passage 44 feeds the airbone particulates tangentially into chamber 50, so that the air-particulate mix is caused to spin around the axis of tube 48. The particulates are thrown centrifugally against the inner surface of cylindrical wall 46, while particle-free air occupies the inner space surrounding tube 48. Fan 32 pulls the particle-free air upwardly through tube 48; particulates migrate downwardly along cylindrical wall 46 onto a conical (funnel-shaped) wall 52. An opening at the lower end of wall 52 allows the particulates to gravitationally move downwardly into the aforementioned container 40.

Container 40 is detachably suspended from the passage structure so that when the container is substantially filled with particulates (fragmented debris) the container can be removed for disposal of the particulates into a bag, bucket, or other disposal device. Container 40 can be formed of a transparent plastic material, to enable the person to ascertain when the container is substantially filled with particulates.

To summarize the operation of the illustrated vacuum, when motor 30 is turned on, the fan rotor 33 and cutter blade 38 are rotated synchronously around the shaft 34 axis. Air and entrained debris are drawn upwardly through passage structure 12, so that cutter blade 38 cuts the upflowing debris into relatively small particulates. The airborne particulates are drawn upwardly through spiral passage 44 into particulate separation chamber 50.

The air-particulate mixture spins around air tube 48, so that particulates are concentrated on wall 46, while particle-free air occupies the annular space surrounding tube 48. Particulates are deposited into container 40, while particle-free air is drawn upwardly through tube 48 for discharge to the atmosphere.

What is claimed:

1. A portable vacuum for removing debris from the ground surface, comprising:

an upright air-debris passage means having a lower intake end for drawing air and debris from a ground surface;

two aligned ground wheels connected to said passage means for supporting said passage means so that said intake end is located in close proximity to the ground surface;

a shoulder strap connected to said passage means, and a hand grip connected to said passage means for wardly from said shoulder strap so that a person is able to grasp the hand grip with one hand while the strap is in a suspended position on the person's shoulder;

a fan located within said passage means for drawing air and entrained debris upwardly through said passage means; an electric motor mounted on said passage means; said motor having a shaft operatively connected to said fan, whereby said fan is powered by said motor;

a motor-control pushbutton switch located on said hand grip, whereby said fan can be truned on or off;

a centrifugal debris-separation means located in said passage means between said intake end and said fan, said debris-separation means having a discharge duct for receiving the separated debris; and a removable collection receptacle communicating with said discharge duct for receiving debris that has been separated from the air flowing through said passage means.

2. The vacuum of claim 1, and further comprising a debris cutter means located in said passage means between said intake end and said debris-separation means.

3. The vacuum of claim 2, wherein said debris cutter means comprises a cutter blade attached to said motor shaft, whereby said motor serves as a power source for said fan and said debris cutter means.

4. The vacuum of claim 1, wherein said fan is a centrifugal fan; said passage means comprising a scroll housing for said centrifugal fan.

* * * * *